US012784105B2

(12) United States Patent
Sheikh et al.

(10) Patent No.: US 12,784,105 B2
(45) **Date of Patent: *Nov. 3, 2026**

(54) DECENTRALIZED COMPUTING SYSTEM AND METHOD OF OPERATING DECENTRALIZED COMPUTING SYSTEM

(71) Applicant: METTALEX LIMITED, Bury St Edmunds (GB)

(72) Inventors: Humayun Munir Sheikh, Bury St Edmunds (GB); Chirag Maliwal, Bury St Edmunds (GB); Mehul Surendra Gaidhani, Bury St Edmunds (GB)

( * ) Notice: Subject to any disclaimer, the term of this patent is extended or adjusted under 35 U.S.C. 154(b) by 0 days.

This patent is subject to a terminal disclaimer.

(21) Appl. No.: 19/325,678

(22) Filed: Sep. 11, 2025

(65) Prior Publication Data

US 2026/0010955 A1 Jan. 8, 2026

Related U.S. Application Data

(63) Continuation-in-part of application No. 18/515,641, filed on Nov. 21, 2023, now Pat. No. 12,437,278.

(51) Int. Cl.
*G06Q 40/04* (2012.01)
*G06Q 20/38* (2012.01)
*G06Q 20/40* (2012.01)

(52) U.S. Cl.
CPC ......... *G06Q 40/043* (2025.08); *G06Q 20/389* (2013.01); *G06Q 20/401* (2013.01)

(58) Field of Classification Search
CPC ... G06Q 40/043; G06Q 20/389; G06Q 20/401
(Continued)

(56) References Cited

U.S. PATENT DOCUMENTS

2016/0092988 A1* 3/2016 Letourneau .......... G06Q 20/223 705/66
2020/0250752 A1* 8/2020 Sugarman ............. H04L 9/3239
(Continued)

OTHER PUBLICATIONS

Liu Congcong et al: "Comparison of Centralized and Peer-to Peer Decentralized Market Designs for Community Markets", IEEE Transactions On Industry Applications, IEEE Service Center, Piscataway, NJ, US, vol. 58, No. 1, Oct. 14, 2021 (Oct. 14, 2021 ), pp. 67-77.
(Continued)

*Primary Examiner* — Courtney P Jones
(74) *Attorney, Agent, or Firm* — RC Trademark Company

(57) ABSTRACT

Disclosed is a decentralized computing system for enabling autonomous agent-based trading, the system comprising: computing nodes implementing trading platform; distributed computing arrangement coupled to the nodes; user devices; and agent database comprising autonomous agents associated with the devices; computing node(s) is configured to: receive, from first and second user devices, respective requests for placing first and second trades; a first autonomous agent is configured to send, to second AA via communication interface, first set of trade parameters and digital signature; second AA is configured to perform trade match between first and second trade parameters; distributed computing arrangement comprises: verification module to lock funds, receive and verify digital signature and trade parameters, and transfer funds to execution module; and execution module to lock trade subject and transfer funds to second user and trade subject to first user, completing trading.

18 Claims, 4 Drawing Sheets

(58) Field of Classification Search
USPC .......................................................... 705/75
See application file for complete search history.

(56) References Cited

U.S. PATENT DOCUMENTS

| | | | | |
|---|---|---|---|---|
| 2021/0192517 A1* | 6/2021 | Barnes | ................. | G06Q 20/389 |
| 2024/0037646 A1* | 2/2024 | Sheikh | ................... | G06N 5/043 |
| 2024/0302803 A1* | 9/2024 | Bagoly | .............. | G05B 13/0265 |

OTHER PUBLICATIONS

Sridhar Sashank et al: "Decentralized Stock Exchange Implementation using Ethereum", 2020 International Seminar On Intelligent Technology and Its Applications (ISITIA), IEEE, Jul. 22, 2020 (Jul. 22, 2020), pp. 234-241.
International Search Report and Written Opinion issued for International Patent Application PCT/IB2024/061616, on Feb. 21, 2025, 13 Pages.

* cited by examiner

DECENTRALIZED COMPUTING SYSTEM AND METHOD OF OPERATING DECENTRALIZED COMPUTING SYSTEM

CROSS-REFERENCE TO RELATED APPLICATIONS

This application is a Continuation-in-Part of U.S. patent application Ser. No. 18/515,641, filed on 21 Nov. 2023, which is hereby incorporated by reference in its entirety.

TECHNICAL FIELD

The present disclosure relates to decentralized computing systems for enabling autonomous agent-based trading. Moreover, the present disclosure relates to methods of operating the decentralized computing systems.

BACKGROUND

In the ever-evolving landscape of decentralized finance (DeFi), decentralized exchange (DEX) serves as a fundamental component reshaping the way financial transactions occur in the digital age. The decentralized exchange refers to a peer-to-peer marketplace that facilitates direct transactions between users (such as traders) without a central authority or an intermediary (such as banks, brokers, and the like).

Generally, the decentralized exchange enables decentralized trading for assets such as cryptocurrencies and derivatives. However, such decentralized exchange offers a limited selection of assets for trading, thus limiting the users looking to diversify their portfolios with a broader range of assets, including commodities. Moreover, such decentralized exchange is complex to navigate, especially for new users. The complexity restricts the users from using the decentralized exchange effectively. Furthermore, such decentralized exchange encounters liquidity issues that restrict the users from executing large orders without significantly impacting market prices.

Additionally, existing decentralized exchange is not user-friendly, thus discouraging the users from using thereto. Moreover, the existing decentralized exchange is prone to malicious tokens that may be designed to deceive or harm unsuspecting users, leading to issues of trust and security within the decentralized exchange ecosystem.

Therefore, in light of the foregoing discussion, there exists a need to overcome the aforementioned drawbacks.

SUMMARY

The aim of the present disclosure is to provide a decentralized computing system for enabling autonomous agent-based trading and a method of operating decentralized computing system to introduce an ingenious agent-based architecture that revolutionizes trading by facilitating direct interactions among users. The aim of the present disclosure is achieved by a decentralized computing system for enabling autonomous agent-based trading and a method of operating decentralized computing system as defined in the appended independent claims to which reference is made to. Advantageous features are set out in the appended dependent claims.

Throughout the description and claims of this specification, the words “comprise”, “include”, “have”, and “contain” and variations of these words, for example “comprising” and “comprises”, mean “including but not limited to”, and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
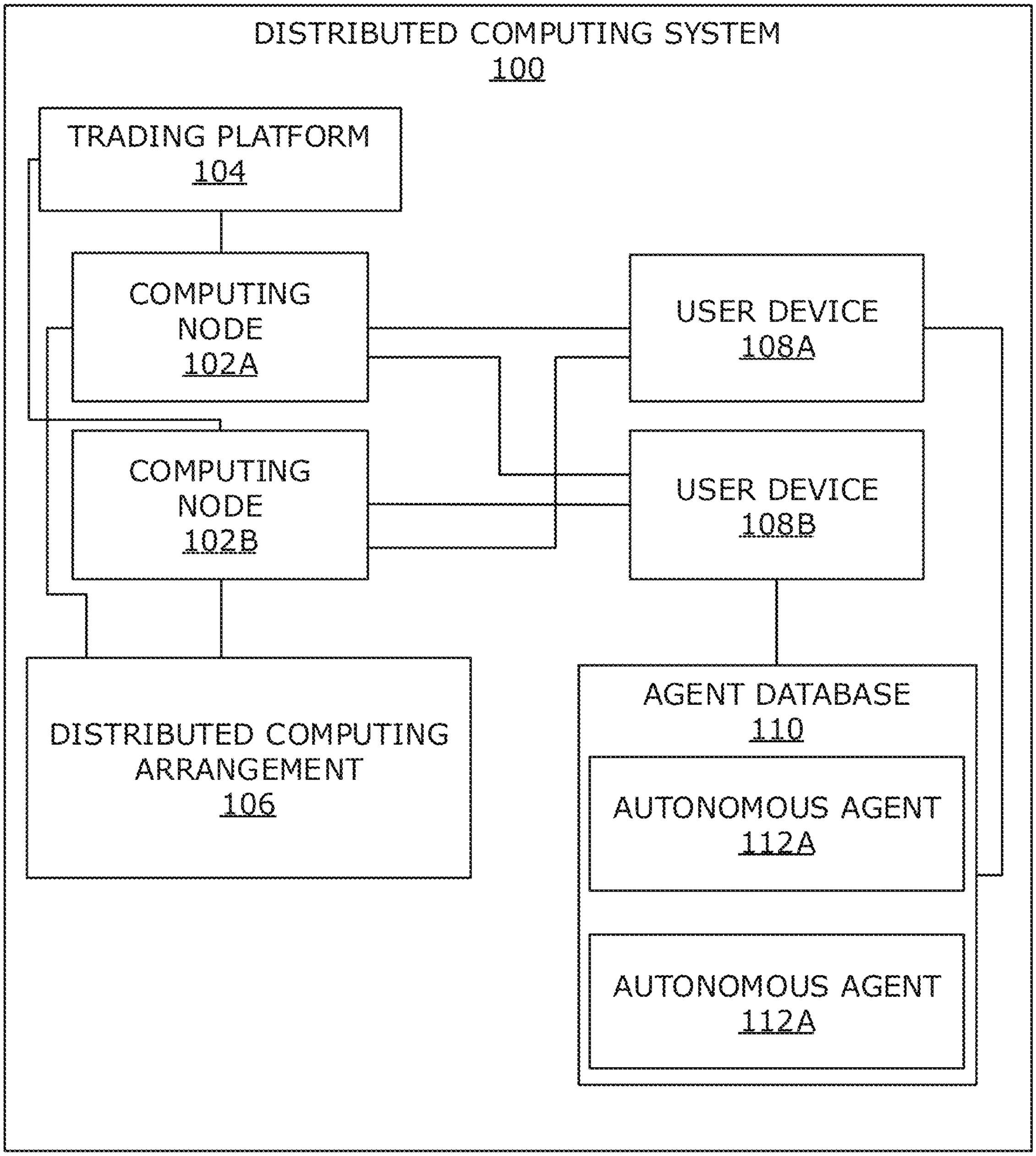
FIG. 1 is an illustration of a decentralized computing system for enabling autonomous agent-based trading, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, the present disclosure provides a decentralized computing system for enabling autonomous agent-based trading, the decentralized computing system comprising:

- a plurality of computing nodes implementing a trading platform;
- a distributed computing arrangement communicably coupled to the plurality of computing nodes;
- a plurality of user devices; and
- an agent database comprising a plurality of autonomous agents associated with the plurality of user devices,
- wherein at least one computing node is configured to:
  - receive, from a first user device, a first request for placing a first trade on a trading platform; and
  - receive, from a second user device, a second request for placing a second trade on the trading platform,
- wherein a first autonomous agent is associated with the first user device and is configured to send to a second autonomous agent in the agent database via a communication interface, a first set of trade parameters corresponding to the first trade and a first digital signature of the first autonomous agent,
- wherein the second autonomous agent associated with the second user device and is configured to perform a trade match between the first set of trade parameters and a second set of trade parameters corresponding to the second trade; and
- wherein the distributed computing arrangement comprises:
  - a verification module configured to:
    - lock funds for the first trade;
    - receive, from the second autonomous agent, the first digital signature, the first set of trade parameters, and the second set of trade parameters;
    - verify the first digital signature, the first set of trade parameters, and the second set of trade parameters; and transfer the locked funds to an execution module; and the execution module communicably coupled to the verification module via a processing interface of the at least one computing node and configured to:

lock a trade subject for the second trade; and transfer the locked funds to the second user device and the locked trade subject to the first user device, thereby completing the autonomous agent-based trading The aforementioned decentralized computing system provides a secure and efficient environment for the autonomous agent-based trading. Such an environment is realized by employing the plurality of computing nodes that collectively implement the trading platform and are communicably coupled to the distributed computing arrangement. The plurality of user devices serves as access points for users, while the agent database comprising the plurality of autonomous agents ensures that each user device is represented by an autonomous entity. The first autonomous agent and the second autonomous agent, associated with the first user device and the second user device respectively, enable peer-to-peer communication, thereby fostering efficient and direct interaction between the trading parties. The distributed computing arrangement further comprises the verification module and the execution module, which together ensure that trades are only executed after proper verification of the first and the second set of trade parameters and the first and second digital signatures, and after locking of the funds and the trade subject. Through this layered operation, the decentralized computing system guarantees fairness, transparency, and user confidence, while ensuring that both the first trade and the second trade are completed securely and reliably.

In a second aspect, the present disclosure provides a method of operating a decentralized computing system, the method comprising:

receiving, from a first user device, a first request for placing a first trade on a trading platform;

receiving, from a second user device, a second request for placing a second trade on the trading platform;

sending a first set of trade parameters corresponding to a first trade and a first digital signature of a first autonomous agent, from a first autonomous agent to a second autonomous agent via a communication interface, the first autonomous agent being associated with the first user device and the second autonomous agent being in an agent database;

performing a trade match between the first set of trade parameters and the second set of trade parameters corresponding to a second trade, by configuring the second autonomous agent, wherein the second autonomous agent is associated with the second user device;

configuring a verification module to:

lock funds for the first trade;

receive, from the second autonomous agent, the first digital signature, the first set of trade parameters, and the second set of trade parameters;

verify the first digital signature, the first set of trade parameters, and the second set of trade parameters; and transfer the locked funds to an execution module; and configuring an execution module, that is communicably coupled to the verification module, to:

lock a trade subject for the second trade; and transfer the locked funds to the second user device and the locked trade subject to the first user device, thereby completing the autonomous agent-based trading.

The aforementioned method of operating a decentralized computing system ensures transparent and secure autonomous agent-based trading. The plurality of computing nodes receives the first request from the first user device and the second request from the second user device, thus ensuring that user intentions are captured accurately. The first autonomous agent and the second autonomous agent, associated with the first and second user devices respectively, communicate through the communication interface, thereby enabling direct and secure exchange of the first set and the second set of trade parameters and the first and the second digital signatures. The second autonomous agent performs the trade match between the first set and the second set of trade parameters, thus ensuring that the first and the second trades proceed only when conditions align. The verification module locks the funds and performs cryptographic verification before transferring the funds to the execution module. The execution module subsequently locks the trade subject and completes the exchange between the first user device and the second user device. Thus, the autonomous agent-based trading is executed with fairness, integrity, and efficiency.

Throughout the present disclosure, the term "decentralized computing system" as used herein refers to a networked arrangement of multiple computing nodes interconnected through a data communication network. The plurality of computing nodes includes computing arrangements that are operable to respond to, and processes instructions and data therein. The computing arrangements may include, but are not limited to, a microprocessor, a microcontroller, a complex instruction set computing (CISC) microprocessor, a reduced instruction set (RISC) microprocessor, a very long instruction word (VLIW) microprocessor, an artificial intelligence (AI) computing engine based on hierarchical networks of variable-state machines, or any other type of processing circuit. Furthermore, the computing arrangements can be one or more individual processors, processing devices and various elements associated with a processing device that may be shared by other processing devices. Additionally, the computing arrangements are arranged in various architectures for responding to and processing the instructions that drive the decentralized computing system. Moreover, the plurality of computing nodes is communicably coupled to each other via the data communication network that allows for communication among the plurality of computing nodes. Notably, the data communication network refers to an arrangement of interconnected, programmable and/or non-programmable components that, when in operation, facilitate data communication between one or more electronic devices and/or databases. Furthermore, the data communication network may include, but is not limited to, a peer-to-peer (P2P) network, a hybrid peer-to-peer network, local area networks (LANs), radio access networks (RANs), metropolitan area networks (MANs), wide area networks (WANs), all of or a portion of a public network such as global computer network known as the Internet®, a private network, a cellular network and any other communication system. Additionally, the data communication network employs wired or wireless communication that can be carried out via one or more known protocols.

Herein, the trading platform refers to a digital environment that serves as a foundation for enabling various functionalities, particularly autonomous agent-based trading.

Optionally, the trading platform is a technological infrastructure that facilitates and coordinates trading activities. The plurality of computing nodes collectively implements the trading platform, such that the trading platform is instantiated and executed across the plurality of computing nodes in a distributed manner.

The distributed computing arrangement is communicably coupled to the plurality of computing nodes. The distributed computing arrangement is implemented as coordinated processing resources that operate across the plurality of computing nodes via the data communication network, and provides a distributed environment for performing verification and execution operations associated with trading.

Throughout the present disclosure, the term "user device" as used herein refers to an electronic device that a given user interacts with to access the decentralized computing system. Examples of the user device may include, but are not limited to, smartphones, tablets, laptops, or desktop computers. The plurality of user devices acts as interfaces for users to engage with the decentralized computing system. Herein, the first user device is associated with a first user and initiates the first request. Herein, the second user device is associated with a second user and initiates the second request. In an example, the first request is to purchase 50 tokens. In an example, the second request is to sell 50 tokens. Herein, the first trade and the second trade refer to a specific transaction that results from the first request and the second request, respectively. In this regard, the first trade and the second trade involve the exchange of assets or securities as per the first request and the second request made by the first user device and the second user device, respectively.

Throughout the present disclosure, the term "agent database" refers to a structured repository of the plurality of autonomous agents. In this regard, the autonomous agents are individual programs stored and managed within the agent database, each being associated with a corresponding user device. Moreover, each user device has its own autonomous agent which is irreplaceable directly by the decentralized computing system. Optionally, the agent database maintains a record of association between each user device and its corresponding autonomous agent. The autonomous agent getting notified is an action that results from the autonomous agent monitoring particular smart contracts (such as the smart contracts associated with the corresponding user) for change of state (such as the data stored in the smart contract).

Throughout the present disclosure the term "autonomous agents" as used herein, relates to computational entities or software programs that are designed to perform tasks or make decisions autonomously, without direct human intervention. The autonomous agent could perceive their environment, analyze information, and take actions based on predefined rules, algorithms, or learning capabilities. Optionally, the autonomous agent is an autonomous economic agent (AEA). Optionally, each of the autonomous agent has predefined roles in the trading process, enabling automation and efficient execution of trades.

A given request is received from at least one of: a software application executing on a given user device, a software application executing on a computing device that is communicably coupled to the given user device, a cloud-based software application, a digital twin of the given user a digital representation of the given user, an artificial intelligence model (AI-model) based on a Large Language Model (LLM). Herein, the term "given request" encompasses the first request and the second request.

In this regard, for example, the software application could be a trading interface application. In such a case, a trader may use the trading interface application on their computer to make the given request to execute a given trade. Optionally, the software application could be an algorithmic trading bot that is communicably coupled to the given user's trading account. Optionally, the cloud-based software application could be a price tracking and analysis tool provided by the platform. Optionally, the service request can be received from the digital twin that refers to a virtual representation of the given user. Optionally, the given digital twin employs market data analysis, machine learning, and algorithmic decision-making to assist the given user in executing the given request. For example, the digital representation could be a trading assistant bot or an AI model that interacts with the platform on the given user's behalf.

The at least one computing node is configured to receive the first request from the first user device for placing the first trade, thereby enabling initiation of respective trades on the trading platform.

Herein, the communication interface refers to an interface that enables direct and secure interaction between the first autonomous agent and the second autonomous agent involved in the first trade and the second trade. The communication interface is automatically created once the decentralized computing system identifies that the first and the second autonomous agent are required to interact with each other to fulfil the request for the trade. The communication interface may also be referred to a piece of software or a set of instructions which when executed enables the first autonomous agent and the second autonomous agent to communicate. The communication interface serves to exchange crucial trade-related information, such as trade parameters and digital signatures, which are essential for the verification module and the execution module. This peer-to-peer communication enhances the efficiency and security of the trading. Herein, a given digital signature serves as a cryptographic proof of its identity and authorization. In this regard, the first autonomous agent transmits the first set of trade parameters and the first digital signature to the second autonomous agent via the communication interface, and such data that has been transmitted is stored in the agent database for future reference when the verification module is used. In this regard, the first autonomous agent associated with the first user represents on behalf of the first user who is a first party, and the second autonomous agent associated with the second user represents on behalf of the second user who is a second party in a peer-to-peer decentralized transaction. The communication interface ensures that these crucial trade elements are exchanged in a secure and efficient manner, promoting effective peer-to-peer interaction between the autonomous agents.

Moreover, the second autonomous agent, representing one party in the trade, is configured to perform the trade match. Furthermore, the trade match involves comparing the first set of trade parameters and the second set of trade parameters originating from the second request made by the second user device, to determine if there is a suitable trade match with the second autonomous agent trade parameters. Once the trade match is identified, the second autonomous agent is configured to send the first digital signature along with the first set of trade parameters and the second set of trade parameters.

The verification module is implemented as a software and/or a hardware component executing across the plurality of computing nodes, and is communicably coupled to the agent database and the plurality of autonomous agents via the data communication network. The verification module is configured to lock funds corresponding to the first trade, ensuring that required financial resources are reserved before any further processing. The verification module then receives, from the second autonomous agent, the first digital signature along with the first and the second set of trade parameters. Herein, the verification module performs verification by employing cryptographic verification routines and integrity checks, where the verification module validates the first digital signal received from the first autonomous agent, and authenticity and consistency of the first and the second trade parameters. The verification module is implemented to prevent fraudulent or unauthorized trades, thereby maintaining trust and security in the decentralized computing system. Upon successful verification, the verification module transfers the locked funds to the execution module for subsequent settlement.

The execution module is implemented as a coordinated set of processing instructions executing on the at least one computing node and is communicably coupled to the verification module via the processing interface. The execution module is configured to lock the trade subject corresponding to the second trade. When both the funds and the trade subject are locked, the execution module initiates settlement by transferring the locked funds to the second user device and the locked trade subject to the first user device. The execution module thus ensures finality, fairness, and non-repudiation of the trade, thereby completing the autonomous agent-based trading.

Throughout the present disclosure, the term "processing interface" as used herein refers to a software module or component that allows for the processing and management of various operations related to agent-based trade matching within the decentralized computing system. In this regard, the processing interface is used by the at least one computing node to facilitate to handle the coordination, validation, and execution of the agent-based trade matches and related actions. The processing interface comprises multiple functional layers including: (i) an agent coordination layer configured to manage interactions between autonomous agents, intermediate autonomous agents, and system modules; (ii) a data transformation component configured to convert and format data exchanged between different system components; (iii) a security validation layer configured to ensure cryptographic integrity and authentication of inter-component communications; and (iv) a transaction state management component configured to track and coordinate the progress of trades through verification and execution phases.

The processing interface is used by the at least one computing node to handle the coordination, validation, and execution of agent-based trade matches and related actions. The processing interface enables secure communication between the verification module and the execution module, where verified trade data, locked funds, and validation results are transferred while maintaining cryptographic integrity and audit trails. When intermediate agents are present, the processing interface additionally coordinates their specialized processing operations and integrates their validation results into the overall trading workflow.

Throughout the present disclosure, the term "trade subject" as used herein refers to an item or asset that is being traded. Optionally, the trade subject is selected from at least one of: a commodity, a digital currency. Herein, the commodity refers to a tangible good or product that can be bought or sold, such as agricultural produce, metals, or energy resources. Herein, the digital currency represents a form of currency that exists solely in electronic or digital form, typically utilizing cryptographic techniques for secure transactions. Optionally, the digital assets include but are not limited to cryptocurrencies, NFTs, and digital representations of real-world assets. By incorporating the commodities and the digital currencies into the decentralized computing system, the plurality of user devices can engage in diverse trading activities, thereby expanding the scope and versatility of the trading platform.

Moreover, the transfer of the locked funds is initiated only after a consensus is reached between the plurality of computing nodes in the decentralized computing system. Furthermore, the transfer of the locked funds is traceable and transparent in the decentralized computing system.

Optionally, the decentralized computing system further comprises one or more intermediate autonomous agents, where each intermediate autonomous agent is associated with a corresponding intermediate user. The term "intermediate user" refers to a user entity that operates between the first user and the second user in multi-party trading scenarios, facilitating complex trading arrangements that require intermediary processing, validation, or coordination steps. The intermediate user may be a market maker, a compliance officer, a risk assessor, or any specialized entity that provides value-added services in the trading process.

The at least one computing node is configured to introduce the one or more intermediate autonomous agents that interact with both the first autonomous agent and the second autonomous agent. In this regard, the first trade occurs between the first autonomous agent and the one or more intermediate autonomous agents, and the second trade occurs between the one or more intermediate autonomous agents and the second autonomous agent. The intermediate autonomous agent operates independently from the first autonomous agent and the second autonomous agent while being communicably coupled to both through the communication interface. The intermediate autonomous agent is stored and managed within the agent database alongside other autonomous agents, where the agent database maintains a record of association between each intermediate user and its corresponding intermediate autonomous agent.

This arrangement ensures that a required trade between the first user device and the second user device can be completed even when either autonomous agent does not directly possess final trade subject required for settlement. Instead, the one or more intermediate autonomous agents participate in intermediary transactions that bridge a gap between the first autonomous agent and the second autonomous agent, thereby facilitating indirect fulfilment of the trade.

A technical effect of the aforementioned feature is that decentralized trading is made more robust and versatile, since the first and the second trades can be successfully executed through the one or more intermediate autonomous agents, thereby ensuring that the plurality of user devices can complete trades even in the absence of direct matching of trade subjects.

The processing interface facilitates communication between the intermediate agent and other system components by providing secure data exchange channels, state synchronization mechanisms, and error handling protocols. When an intermediate agent is involved in a trade, the processing interface ensures that all relevant trade data, validation results, and processing outcomes are properly coordinated between the verification module, execution module, and the intermediate agent.

Optionally, the distributed computing arrangement is a distributed ledger arrangement, where the distributed ledger arrangement is consensually shared and synchronized in a decentralized form across the plurality of autonomous agents. It will be appreciated that the decentralized computing system empowers transparency and trust through the distributed ledger arrangement such as in blockchain. Herein, the term "distributed ledger arrangement" refers to a ledger (such as a database) comprising entries recording operations. In this regard, a plurality of first computing nodes implements a distributed ledger technology (DLT) technology. Beneficially, the DLT allows for secure and transparent record-keeping, without the need for intermediaries or centralized authorities. In operation, each computing node validates proposed entries or blocks of data before appending them to the distributed ledger arrangement. Upon validation, the entries or the blocks of data are consensually replicated across the plurality of computing nodes and synchronized among the plurality of autonomous agents, thereby ensuring that all participants operate on a consistent and tamper-proof version of the distributed ledger arrangement. Optionally, the distributed ledger arrangement refers to a database of entries or blocks of data such as a blockchain. The distributed ledger arrangement ledger ensures that all data and models are tamper-proof and transparent to the plurality of autonomous agents. A technical effect of the aforementioned feature is that trade-related data is rendered tamper-proof and transparently available to all participating autonomous agents, thereby eliminating reliance on intermediaries and enhancing trust in the decentralized computing system.

Optionally, the distributed ledger arrangement is a database of entries or blocks, where upon locking of the funds for the first trade or locking of the trade subject for the second trade, a new block is created in the distributed ledger arrangement. Herein, locking of the funds for the first trade or locking of the trade subject for the second trade involves executing a transaction which appends a new entry in the distributed ledger arrangement such as a new block in the blockchain. Moreover, execution of the transaction for the locking of the fund for the first trade or the trade subject for the second trade results in a transfer of ownership of the locked fund or the locked trade subject.

Further, the execution of the transfer of the locked funds and the locked trade subject is associated with generating a new block in the blockchain.

A new block is generated only when the consensus is reached between the plurality of computing nodes in the decentralized computing system, thus ensuring the generation of a valid new block. In this regard, a consensus protocol ensures achieving reliability and trustworthiness between the plurality of computing nodes being unknown to each other.

Thus, locking of the funds or the trade subject triggers execution of the transaction, which, once validated through the consensus among the plurality of computing nodes, results in the creation of the new block. This new block immutably records a state change corresponding to the transfer of ownership of the locked funds or the locked trade subject, ensuring that the transaction is permanently and transparently available in the distributed ledger arrangement. A technical effect of the aforementioned feature is that each trade-related state change, such as locking or transferring ownership of funds and trade subjects, is immutably recorded in the distributed ledger, thereby guaranteeing transparency, non-repudiation, and tamper-resistance of the decentralized trading process.

Optionally, the at least one computing node is configured to:

generate a first notification in response to receiving the first request;

generate a second notification in response to receiving the second request;

send the first and second notifications to the agent database, determine whether a set of autonomous agents configured to serve the first and second requests exists in the agent database;

when the set of autonomous agents configured to serve the first and second requests exists in the agent database, employ existing autonomous agents of the set as the first autonomous agent for the first request and as the second autonomous agent for executing the second request; and when the set of autonomous agents configured to serve the first and second requests does not exist in the agent database, create new autonomous agents and employ the new autonomous agents as the first autonomous agent for executing the first request and as the second autonomous agent for executing the second request.

Herein, the term "notification" refers to an automated message that facilitates communication between a given user device, a given autonomous agent, and the trading platform. Herein, the term "given user device" encompasses namely the first user device and the second user device. The term "given autonomous agent" encompasses namely the first autonomous agent and the second autonomous agent.

In this regard, when the first user places the first trade using the first user device, the at least one computing node receives the first request. The at least one computing node then formulates the first notification and sends the first notification to the agent database. The agent database identifies the first autonomous agent associated with the first user and provides the first notification thereto. In this regard, when the second user places the second trade using the second user device, the at least one computing node receives the second request. The at least one computing node then formulates the second notification and sends the second notification to the agent database. The agent database identifies the second autonomous agent associated with the second user and provides the second notification thereto.

Herein, upon receiving the first request and the second request, the at least one computing node checks whether the set of autonomous agent configured to serve both the first request and the second request already exists in the agent database. If the suitable set of autonomous agents is found in the agent database, the at least one computing node assigns the existing autonomous agents to serve the first request and the second request. This ensures efficient utilization of resources and expertise. For example, if the first request involves commodities and derivatives trading, the at least one computing node may assign a set of autonomous agents specialized in these markets. Herein, the set of autonomous agents comprises one or more autonomous agents.

Moreover, optionally, in another case where there is no existing autonomous agent suitable for fulfilling the first request, the at least one computing node is configured to create the new autonomous agent. The new autonomous agent is then assigned to serve the first request. For example, if a user's requests are related to a highly specialized or niche market, the at least one computing node generates the autonomous agent trained specifically for that market. It will be appreciated that the decentralized computing system optimizes utilization of the autonomous agents by reusing existing ones when appropriate. This reduces the overhead associated with creating the new autonomous agents for every request, enhancing the decentralized computing system's efficiency. Additionally, by creating the new autonomous agents when needed, the decentralized computing system ensures scalability. The decentralized computing system can dynamically adapt to a growing number of the first requests and the first users.

Furthermore, the decentralized computing system allows for the creation of the specific autonomous agents tailored to unique first requests, ensuring that each first request is handled by the suitable autonomous agent with the relevant expertise. Optionally, the at least one computing node is configured to perform the same steps for the second request as well, ensuring that each trade request, whether the first or second, is handled efficiently and with the most appropriate autonomous agent.

A technical effect of configuring the at least one computing node in such a manner is that the decentralized computing system reduces overhead by reusing existing autonomous agents when appropriate, while maintaining scalability by dynamically creating new agents for novel requests. This ensures efficient resource utilization, adaptability to diverse trading scenarios, and improved responsiveness of the decentralized computing system.

Optionally, the first set of trade parameters comprises at least one of: a timeframe needed for completion of the first trade, a cost associated with the first trade, a quantity associated with the first trade, a quality associated with the first trade, a customized instruction associated with the first trade, an asset type, a preference of the autonomous agents, delivery terms. In this regard, the timeframe parameter may specify a specific duration within which the first trade should be completed. Optionally, the cost parameter may indicate the monetary value associated with executing the first trade. Optionally, the quantity parameter may define the amount or volume involved in the first trade. Optionally, the quality parameter may describe the desired level of excellence or standard for the first trade. Optionally, the customized instruction parameter may provide specific instructions or requirements for the execution of the first trade. Optionally, the asset type parameter may identify the type or category of asset involved in the first trade. Optionally, the preference parameter may indicate the favored choice or inclination of the first autonomous agent and the second autonomous agent involved in the trade. Optionally, the delivery terms parameter may specify the conditions or terms for the delivery of the traded goods or services. Beneficially, the first set of trade parameters enables flexibility and adaptability in tailoring the execution of the first trade to meet specific requirements and preferences.

A technical effect of the aforementioned feature is that by incorporating the first set of trade parameters in a detailed manner, the decentralized computing system enables precise definition of the first trade, thereby improving the accuracy of trade matching, reducing ambiguity between trading parties, and ensuring that the trade executed by the autonomous agents reflects the specific requirements of the first user device.

Optionally, the second set of trade parameters comprises at least one of: a timeframe needed for completion of the second trade, a cost associated with the second trade, a quantity associated with the second trade, a quality associated with the second trade, a customized instruction associated with the second trade, an asset type, a preference of the autonomous agents, delivery terms. In this regard, the timeframe parameter ensures timely execution of the second trade within a specific time window. The cost parameter provides transparency and well-defined monetary value for the trade. The quantity parameter clarifies the scale of the transaction by defining the volume or amount of assets involved. The quality parameter ensures that the traded items meet predefined criteria. The customized instruction parameter caters to unique requirements by allowing specific directives or preferences. Optionally, the asset type parameter ensures clarity regarding the nature of the transaction. The preference of the autonomous agents parameter is set such that it aligns with the interests and goals of the second user associated with the second autonomous agent. Optionally, the delivery terms parameter enhances transparency and agreement between the first autonomous agent and the second autonomous agent regarding the conditions for delivering goods or services.

A technical effect of the aforementioned feature is that by defining the second set of trade parameters in such a detailed manner, it is ensured that the second trade is accurately represented and aligned with the requirements of the second user device, thereby enabling the second autonomous agent to perform effective trade matching with the first trade parameters and ensuring fairness and reliability in decentralized trading.

Optionally, the second autonomous agent is configured to use a distributed public key infrastructure (PKI) to verify the first digital signature and the first set of trade parameters. Herein, the term "distributed public key infrastructure" refers to a framework used in cybersecurity and cryptography to manage digital keys and certificates.

The distributed public key infrastructure provides a secure way to authenticate the identities of parties involved in digital communications and to ensure the confidentiality and integrity of the information being exchanged. In the distributed PKI, each entity is assigned a pair of cryptographic keys: a public key and a private key. The public key is openly available, while the private key is kept secret. The public key is used to encrypt data or verify digital signatures, and the private key is used to decrypt data or create digital signatures. The distributed public key infrastructure relies on trusted entities, known as certificate authorities (CAs), to issue and verify digital certificates that bind the public key to an individual or entity, ensuring the authenticity and security of online transactions, communications, and data.

A technical effect of the aforementioned feature is that the use of distributed PKI by the second autonomous agent ensures that the first digital signature and the first set of trade parameters are cryptographically authenticated in a decentralized manner, thereby preventing impersonation or tampering and enhancing the overall security and trustworthiness of the autonomous agent-based trading process.

Optionally, the verification module comprises a first smart contract for verifying the first digital signature, the first set of trade parameters, and the second set of trade parameters, where the execution module comprises a second smart contract for transferring the locked funds to the second user and the locked trade subject to the first user, thereby completing the autonomous agent-based trading, and where the first smart contract and the second smart contract are executed on the distributed computing arrangement.

Herein, the term "smart contract" refers to a software contract configured to automatically run when one or more predefined conditions are met in the decentralized computing system. The smart contract automates the execution of an agreement so that all parties involved have certainty of the outcome without requiring intermediaries. Smart contracts are immutable once deployed, thereby preventing malicious actors or third parties from tampering with their execution. When used in the decentralized computing system, smart contracts provide transparency, traceability, and tamper-resistance to the trading process.

When the first user initiates the first trade request, the distributed ledger arrangement automatically deploys a first smart contract that is linked to the first trade request. This first smart contract is configured to receive the first digital signature, the first set of trade parameters, and the second set of trade parameters from the second autonomous agent. Using cryptographic verification routines, the first smart contract verifies the authenticity of the digital signature and the validity of the trade parameters, thereby ensuring that the first and second trades are legitimate before further execution. Similarly, when the second user initiates the second trade request, the distributed ledger arrangement automatically deploys a second smart contract that is linked to the second trade request. The second smart contract is configured to lock the trade subject corresponding to the second trade and, upon successful verification by the first smart contract, to execute settlement by transferring the locked funds to the second user device and the locked trade subject to the first user device.

The processing interface facilitates communication between the first smart contract and the second smart contract. Through this processing interface, the first smart contract can provide verification results and associated trade data to the second smart contract. This interaction ensures that the execution module proceeds only when the verification module successfully completes its operation.

When the second smart contract executes the settlement, ownership of the locked funds is transferred from the first user to the second user, and ownership of the locked trade subject is transferred from the second user to the first user. These ownership transitions are immutably recorded in the distributed ledger arrangement, thereby providing a permanent, tamper-proof record of the completed trade.

A technical effect of the verification module comprising the first smart contract, and the execution module comprising the second smart contract is that the verification and execution of autonomous trades are automated through immutable smart contracts, which ensures that trades are only executed after successful verification, guarantees settlement of the locked funds and trade subjects, and provides tamper-proof recording of ownership transfers in the distributed ledger arrangement. This results in enhanced security, trust, and efficiency in autonomous agent-based trading.

Optionally, the first smart contract is configured to use a distributed public key infrastructure (PKI) to verify the first digital signature and the first set of trade parameters. In this regard, the second autonomous agent uses the distributed public key infrastructure (PKI) to verify the first digital signature and the first set of trade parameters. In this regard, the PKI is employed to validate the authenticity of the digital signature, ensuring that it was created by the authorized party and that the trade parameters are accurate. It will be appreciated that using the distributed PKI system for verification enhances security and trust. For example, if the first user device and the second user device are trading on the trading platform, the distributed PKI would ensure that only the private key of the first user device can generate the first digital signature that can be verified by corresponding public key of the second user device. This cryptographic method ensures the integrity of the first trade and the second trade and the security of the decentralized trading environment.

A technical effect of the aforementioned feature is that the use of distributed PKI ensures cryptographically secure validation of the first digital signature and the first set of trade parameters within the first smart contract, thereby preventing impersonation or forgery and enhancing trustworthiness of verification.

Optionally, the distributed computing arrangement further comprises a smart contract map configured to associate a given smart contract with a given autonomous agent and to record the given smart contract as being associated with the given autonomous agent. Herein, the term "smart contract map" is a component that exists within the distributed ledger arrangement. In this regard, the smart contract map is used for associating the given smart contract (such as the first smart contract or the second smart contract) with the given autonomous agent (such as the first autonomous agent or the second autonomous agent) and maintaining the record of the association. This association is established and maintained to ensure that the smart contracts execute in alignment with the intended actions of the autonomous agents, thereby facilitating the secure and efficient execution of the first request or the second request.

A technical effect of the aforementioned feature is that associating smart contracts with autonomous agents through the smart contract map provides traceability and accountability of contract execution, enabling the at least one computing node to identify which autonomous agent initiated or is responsible for a particular smart contract, thereby improving transparency and governance in decentralized trading.

Optionally, the distributed computing arrangement further comprises an autonomous agent map configured to associate a given autonomous agent with a corresponding functionality and record the given autonomous agent as being associated with the corresponding functionality. Herein, the term "autonomous agent map" as used herein refers to a component within the distributed ledger arrangement. In this regard, the autonomous agent map is used to establish associations between the given autonomous agents and their corresponding functionalities and maintain records of these associations. Moreover, when the new autonomous agent is created or a specific functionality is defined within the decentralized computing system, the autonomous agent map is responsible for recording the relationship between the given autonomous agent and its corresponding functionality. This mapping process provides a clear reference for the at least one computing node to identify which autonomous agent is responsible for carrying out which tasks or actions. For example, it might associate a particular agent with the task of order book-based trade verification, and another agent with order execution. By recording these associations, the at least one computing node can execute tasks efficiently and accurately based on the roles of the autonomous agents.

A technical effect of the aforementioned feature is that maintaining the autonomous agent map ensures that each autonomous agent is linked to its defined functionality, thereby enabling efficient discovery of a given autonomous agent, reducing duplication of roles of the given autonomous agent, and facilitating reliable execution of specialized trading tasks within the decentralized computing system.

Optionally, when the transfer of the locked funds is executed for the first trade from the verification module to the execution module, an ownership of the locked funds is transferred from the first user device to the second user device, and where when the transfer of the locked trade subject is executed for the second trade from the execution module to the verification module, an ownership of the locked trade subject is transferred from the second user device to the first user device. Herein, when the verification module completes validation of the first trade, the locked funds corresponding to the first trade are transferred from the verification module to the execution module. During this transfer, the ownership transition occurs, where the locked funds are transferred from the first user device, which initially held the funds, to the second user device, which is entitled to receive the funds. The distributed computing arrangement ensures that this change in ownership is securely recorded and becomes binding on all participants in the decentralized computing system. Similarly, when the execution module locks the trade subject corresponding to the second trade and executes the trade settlement, the locked trade subject is transferred from the execution module to the verification module. In this process, the ownership of the locked trade subject is transferred from the second user device, which initially owned the trade subject, to the first user device, which is entitled to receive it in exchange for the funds. Herein, both the ownership transfer of funds and the ownership transfer of the trade subject are immutably recorded in the distributed ledger arrangement, ensuring access to a transparent and tamper-proof record of the exchange. These ownership transitions provide finality to the trade, preventing disputes or double-spending, and guaranteeing that each completed trade is enforceable and verifiable.

A technical effect of the aforementioned feature is that the decentralized computing system ensures exchange of ownership between the first and second user devices, such that funds and trade subjects are transferred in a coordinated manner. Hence, such ownership transfer guarantees fairness, prevents fraud, and provides an immutable record of asset ownership transitions within the distributed ledger arrangement, thereby enhancing trust and reliability in decentralized trading.

Optionally, when a given autonomous agent fails to fulfil a given request, the at least one computing node is further configured to select another autonomous agent from the agent database and use the another autonomous agent as a given autonomous agent. In this regard, when the given autonomous agent fails to fulfil the given request, the decentralized computing system employs a mechanism to address the failure of selecting the given autonomous agent. In this regard, the at least one computing node is configured to select an alternative or the another autonomous agent from the agent database. This selection process can be based on various factors, including the type of the first request or the second request, the availability and capabilities of the other autonomous agents, and predefined rules or criteria. Beneficially, such mechanism ensures the decentralized computing system's resilience and continuous operation. For example, if one autonomous agent encounters a problem, such as a technical issue or being overwhelmed with requests, the at least one computing node can swiftly adapt by selecting another autonomous agent to handle the first request or the second request. This process enhances the reliability and fault tolerance of the decentralized computing system, ensuring that requests are addressed even in the face of agent failures. The at least one computing node also contributes to efficient load distribution among the autonomous agents, optimizing their utilization and overall system performance. Additionally, the at least one computing node minimizes service disruptions, ensuring a seamless experience for the first user or the second user.

A technical effect of the aforementioned feature is that dynamic reassignment of requests to alternate autonomous agents provides fault tolerance and service continuity in the decentralized computing system, thereby preventing transaction failures due to individual agent unavailability and ensuring robustness of autonomous trading.

Optionally, the decentralized computing system is further configured to employ a decentralized order book model to store information about the first and the second trades across the plurality of computing nodes. Herein, the term "decentralized order book model" refers to a system for recording and managing trade orders in a distributed and transparent manner. In this regard, the decentralized order book model is used to maintain information about the first trade and the second trade, including corresponding buy and sell orders, across the plurality of computing nodes in the data communication network. In other words, the decentralized order book is a trading mechanism where buy and sell orders are stored and matched through a distributed network of computing nodes, rather than being centralized in a single location or controlled by a single entity. In operation, the decentralized order book model allows users to submit buy and sell orders that are replicated and synchronized across the plurality of computing nodes, ensuring that each computing node maintains a consistent view of pending and executed trades. The decentralized order book thereby records order details for both the first trade and the second trade, which can be validated against trade parameters provided by the first autonomous agent and the second autonomous agent.

A technical effect of the aforementioned feature is that the decentralized order book ensures transparency and fairness in trade execution by making order information consistently available across the plurality of computing nodes, thereby preventing manipulation by any single entity, reducing reliance on intermediaries, and improving the accuracy of order matching in decentralized agent-based trading.

Optionally, the decentralized computing system is further configured to automatically create the communication interface when the first and the second autonomous agents are required to interact with each other to fulfil request for the first and the second trades. Herein, the decentralized computing automatically create the system is configured to communication interface upon detecting that the first autonomous agent and the second autonomous agent must interact to fulfil the first trade and the second trade. This automatic creation is triggered when the computing nodes identify, from trade parameters stored in the agent database, that peer-to-peer interaction between the first and second autonomous agents is required. Such automation ensures that no manual intervention is needed to establish the communication interface. Instead, the plurality of computing nodes dynamically provisions the communication interface at runtime, thereby enabling secure and immediate exchange of trade parameters and digital signatures between the first and second autonomous agents.

A technical effect of the aforementioned feature is that the decentralized computing system reduces configuration overhead and ensures timely availability of a secure channel for peer-to-peer agent interaction, thereby improving the responsiveness, scalability, and security of decentralized trading operations.

The present disclosure also relates to the second aspect as described above. Various embodiments and variants disclosed above, with respect to the aforementioned first aspect, apply mutatis mutandis to the second aspect.

Optionally, the method further comprises:
- generating a first notification in response to receiving the first request;

generating a second notification in response to receiving the second request;

sending the first and second notifications to the agent database, determining whether a set of autonomous agents configured to serve the first and second requests exists in the agent database;

when the set of autonomous agents configured to serve the first and second requests exists in the agent database, employing existing autonomous agents of the set as the first autonomous agent for the first request and as the second autonomous agent for executing the second request; and when the set of autonomous agents configured to serve the first and second requests does not exist in the agent database, creating new autonomous agents and employ the new autonomous agents as the first autonomous agent for executing the first request and as the second autonomous agent for executing the second request.

Optionally, the verification module comprises a first smart contract for verifying the first digital signature, the first set of trade parameters, and the second set of trade parameters, where the execution module comprises a second smart contract for transferring the locked funds to the second user and the locked trade subject to the first user, thereby completing the autonomous agent-based trading.

Optionally, the method further comprises employing a decentralized order book model to store information about the first and the second trades across the plurality of computing nodes.

Optionally, the method further comprises automatically creating the communication interface when the first and the second autonomous agents are required to interact with each other to fulfil request for the first and the second trades.

DETAILED DESCRIPTION OF THE DRAWINGS

Referring to FIG. 1, illustrated is a decentralized computing system 100 for enabling autonomous agent-based trading, in accordance with an embodiment of the present disclosure. The decentralized computing system 100 comprises a plurality of computing nodes (depicted as two computing nodes 102A and 102B) implementing a trading platform 104, a distributed computing arrangement 106 communicably coupled to the two computing nodes 102A and 102B, a plurality of user devices (depicted as two user devices 108A and 108B); and an agent database 110 comprising a plurality of autonomous agents (depicted as two autonomous agents 112A and 112B) associated with two user devices 108A and 108B. Moreover, at least one computing node from amongst the two computing nodes 102A and 102B is configured to perform various operations as described earlier with respect to the aforementioned first aspect.

FIG. 1 is merely an example, which should not unduly limit the scope of the claims herein. A person skilled in the art will recognize many variations, alternatives, and modifications of embodiments of the present disclosure.

Figure 2:
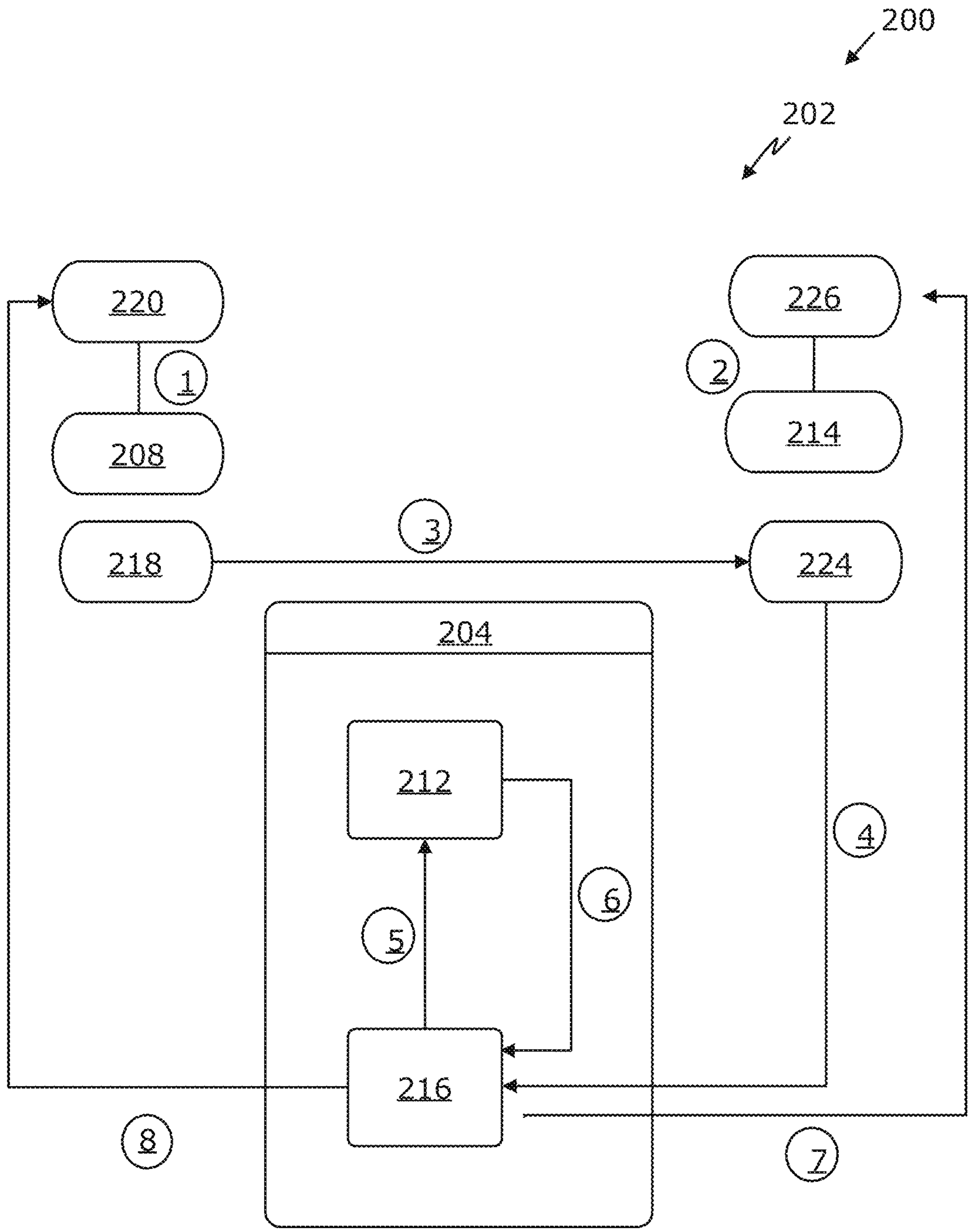
FIG. 2 is an illustration of an exemplary decentralized computing system for enabling autonomous agent-based trading, in accordance with an embodiment of the present disclosure.

Referring to FIG. 2, illustrated is an exemplary decentralized computing system 200 for enabling autonomous agent-based trading, in accordance with an embodiment of the present disclosure. As shown, the decentralized computing system 200 comprises a plurality of computing nodes configured to implement a platform 202 for enabling autonomous agent-based trading using a decentralized order book model, where each computing node is communicably coupled to a distributed ledger arrangement 204, a plurality of user devices, and an agent database comprising a plurality of autonomous agents.

The at least one computing node is configured to: receive, from a first user device 208 amongst the user devices, a first request (at point 1) for placing a first trade on the platform 202, where upon placement of the first trade, a first smart contract 212 executing on the distributed ledger arrangement 204 is configured to lock funds for the first trade; receive, from a second user device 214 amongst the user devices, a second request (at point 2) for placing a second trade on the platform 202, where upon placement of the second trade, a second smart contract 216 executing on the distributed ledger arrangement 204 is configured to lock a trade subject for the second trade; send, to the agent database, a first notification regarding placement of the first trade on the platform 202, for a first autonomous agent 218 associated with a first user 220 of the first user device 208; send, to the agent database, a second notification regarding placement of the second trade on the platform, for a second autonomous agent 224 associated with a second user 226 of the second user device 214, the second user 226 is a second party in the decentralized transaction.

The at least one computing node is configured to create a communication interface for enabling peer to peer communication between the first autonomous agent 218 and the second autonomous agent 224 via the platform, where the first autonomous agent 218 is configured to send (at point 3) a first set of trade parameters and a first digital signature of the first autonomous agent 218 to the second autonomous agent 224 in the agent database.

The at least one computing node is configured to facilitate via a processing interface agent-based trade match via the platform 202, where the second autonomous agent 224 is configured to perform a trade match, and to send (at point 4) the first digital signature along with the first set of trade parameters and a second set of trade parameters to the second smart contract 216, where the second set of trade parameters is related to the second user device.

The at least one computing node is configured to employ the processing interface for enabling order book-based trade verification via the platform 202, where the second smart contract 216 is configured to send (at point 5) the first digital signature along with the first set of trade parameters and the second set of trade parameters to the first smart contract 212 for verification, the first smart contract 212 is configured to verify the first digital signature and the first set of trade parameters and the second set of trade parameters, and upon successful verification, the first smart contract 212 is configured to transfer (at point 6) the funds for the first trade from the first smart contract 212 to the second smart contract 216, the second smart contract 216 is then configured to complete the decentralized trading by executing (at point 7) the transfer of the locked funds to the second user 226 and executing (at point 8) the transfer of the locked trade subject to the first user 220.

FIG. 2 is merely an example, which should not unduly limit the scope of the claims herein. A person skilled in the art will recognize many variations, alternatives, and modifications of embodiments of the present disclosure.

Figure 3A:
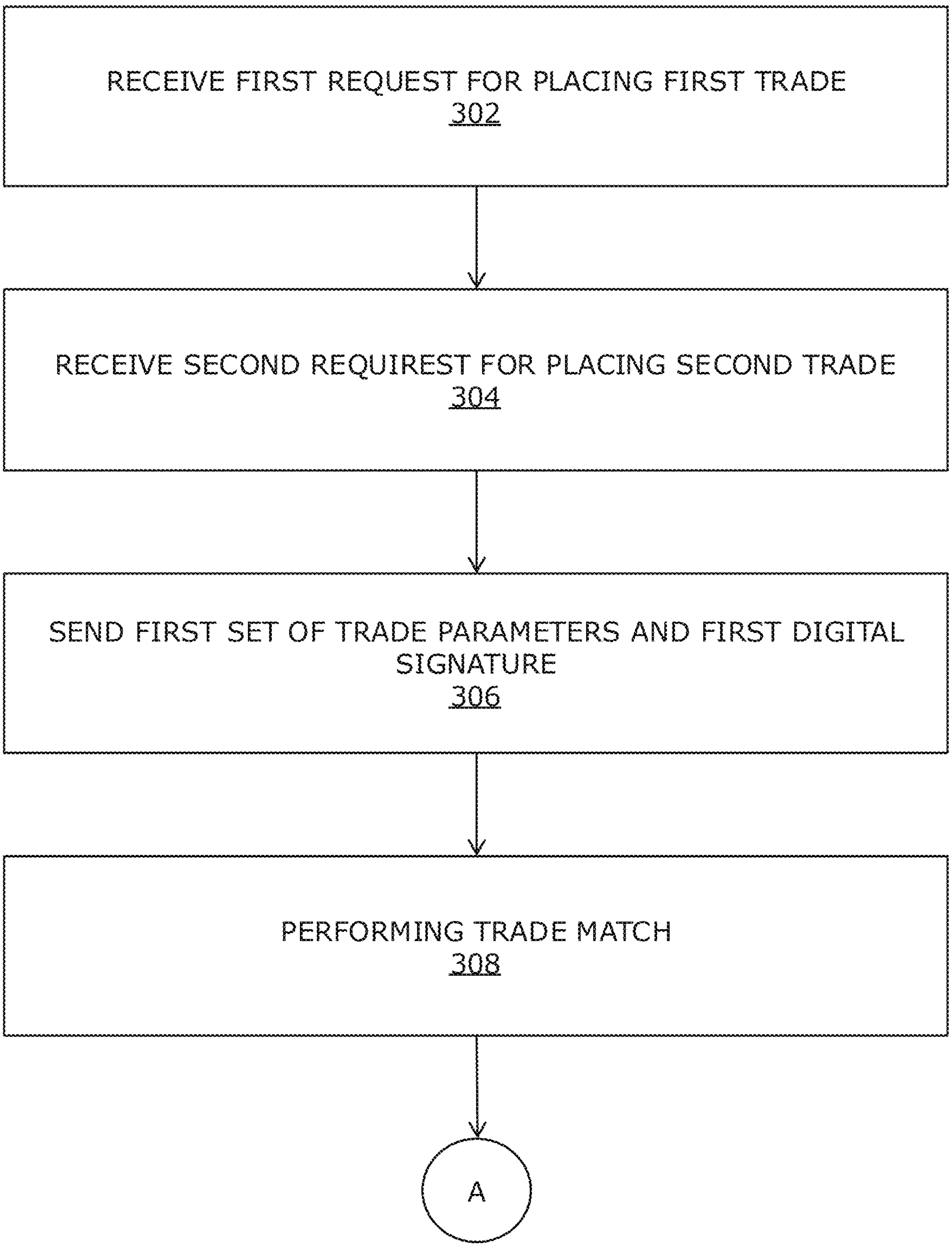
FIGS. 3A and 3B collectively, are illustration of a flowchart depicting steps of a method of operating a decentralized computing system for enabling autonomous agent-based trading, in accordance with an embodiment of the present disclosure.
Figure 3B:
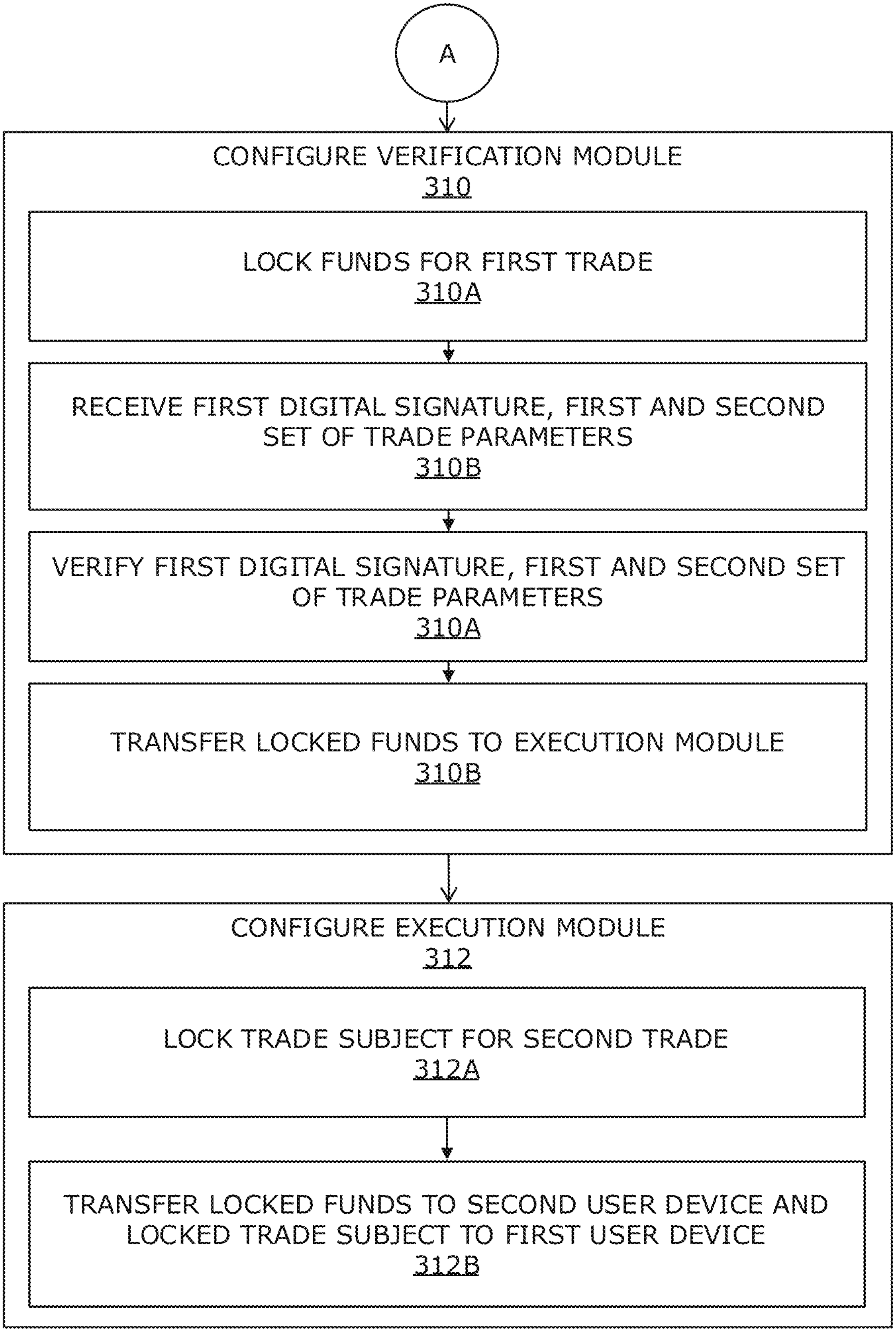

Referring to FIGS. 3A and 3B collectively, illustrated is a flowchart depicting steps of a method of operating a decentralized computing system for enabling autonomous agent-based trading, in accordance with an embodiment of the present disclosure. At step 302, a first request for placing a first trade on a trading platform is received, from a first user device. At 304, a second request for placing a second trade on the trading platform is received from a second user device. At step 306, a first set of trade parameters corresponding to a first trade and a first digital signature of a first autonomous agent are sent from a first autonomous agent to a second autonomous agent via a communication interface, the first autonomous agent being associated with the first user device and the second autonomous agent being in an agent database. At step 308, a trade match between the first set of trade parameters and the second set of trade parameters corresponding to a second trade is performed, by configuring the second autonomous agent, where the second autonomous agent is associated with the second user device. At step 310, a verification module is configured. Herein, at step 310A, funds are locked for the first trade. At step 310B, the first digital signature, the first set of trade parameters, and the second set of trade parameters are received, from the second autonomous agent. At step 310C, the first digital signature, the first set of trade parameters, and the second set of trade parameters are verified. At step 310D, the locked funds are transferred to an execution module. At step 312, an execution module is configured, where the execution module is communicably coupled to the verification module. Herein, at step 312A, a trade subject is locked for the second trade. At step 312B, the locked funds are transferred to the second user device and the locked trade subject to the first user device, thereby completing the autonomous agent-based trading.

The aforementioned steps are only illustrative, and other alternatives can also be provided where one or more steps are added, one or more steps are removed, or one or more steps are provided in a different sequence without departing from the scope of the claims herein.

What is claimed is:

1. A decentralized computing system for enabling autonomous agent-based trading, the decentralized computing system comprising:
- a plurality of computing nodes implementing a trading platform;
- a distributed computing arrangement communicably coupled to the plurality of computing nodes;
- a plurality of user devices; and
- an agent database comprising a plurality of autonomous agents associated with the plurality of user devices,
- wherein at least one computing node is configured to:
  - receive, from a first user device, a first request for placing a first trade on a trading platform; and
  - receive, from a second user device, a second request for placing a second trade on the trading platform,
- wherein a first autonomous agent is associated with the first user device and is configured to send to a second autonomous agent in the agent database, via a communication interface, a first set of trade parameters corresponding to the first trade and a first digital signature of the first autonomous agent,
- wherein the second autonomous agent is associated with the second user device and is configured to perform a trade match between the first set of trade parameters and a second set of trade parameters corresponding to the second trade, and
- wherein the distributed computing arrangement comprises:
  - a verification module configured to:
    - lock funds for the first trade;
    - receive, from the second autonomous agent, the first digital signature, the first set of trade parameters, and the second set of trade parameters;
    - verify the first digital signature, the first set of trade parameters, and the second set of trade parameters; and
    - transfer the locked funds to an execution module; and
  - the execution module communicably coupled to the verification module via a processing interface of the at least one computing node and configured to:
    - lock a trade subject for the second trade; and
    - transfer the locked funds to the second user device and the locked trade subject to the first user device, thereby completing the autonomous agent-based trading,
- wherein the decentralized computing system is configured to automatically create the communication interface when the first and the second autonomous agents are required to interact with each other to fulfill requests for the first and the second trades.

2. The decentralized computing system of claim 1, wherein the distributed computing arrangement is a distributed ledger arrangement, wherein the distributed ledger arrangement is consensually shared and synchronized in a decentralized form across the plurality of autonomous agents.

3. The decentralized computing system of claim 2, wherein the distributed ledger arrangement is a database of entries or blocks, wherein upon locking of the funds for the first trade or locking of the trade subject for the second trade, a new block is created in the distributed ledger arrangement.

4. The decentralized computing system of claim 1, wherein the at least one computing node is configured to:
- generate a first notification in response to receiving the first request;
- generate a second notification in response to receiving the second request;
- send the first and second notifications to the agent database;
- determine whether a set of autonomous agents configured to serve the first and second requests exists in the agent database;
- when the set of autonomous agents configured to serve the first and second requests exists in the agent database, employ existing autonomous agents of the set as the first autonomous agent for executing the first request and as the second autonomous agent for executing the second request; and
- when the set of autonomous agents configured to serve the first and second requests does not exist in the agent database, create new autonomous agents and employ the new autonomous agents as the first autonomous agent for executing the first request and as the second autonomous agent for executing the second request.

5. The decentralized computing system of claim 1, wherein the first set of trade parameters comprises at least one of: a timeframe needed for completion of the first trade, a cost associated with the first trade, a quantity associated with the first trade, a quality associated with the first trade, a customized instruction associated with the first trade, an asset type, a preference of the autonomous agents, delivery terms.

6. The decentralized computing system of claim 1, wherein the second set of trade parameters comprises at least one of: a timeframe needed for completion of the second trade, a cost associated with the second trade, a quantity associated with the second trade, a quality associated with the second trade, a customized instruction associated with the second trade, an asset type, a preference of the autonomous agents, delivery terms.

7. The decentralized computing system of claim 1, wherein the second autonomous agent is configured to use a distributed public key infrastructure (PKI) to verify the first digital signature and the first set of trade parameters.

8. The decentralized computing system of claim 1, wherein the verification module comprises a first smart contract for verifying the first digital signature, the first set of trade parameters, and the second set of trade parameters, wherein the execution module comprises a second smart contract for transferring the locked funds to the second user and the locked trade subject to the first user, thereby completing the autonomous agent-based trading, and wherein the first smart contract and the second smart contract are executed on the distributed computing arrangement.

9. The decentralized computing system of claim 8, wherein the first smart contract is configured to use a distributed public key infrastructure (PKI) to verify the first digital signature and the first set of trade parameters.

10. The decentralized computing system of claim 8, wherein the distributed computing arrangement further comprises a smart contract map configured to associate a given smart contract with a given autonomous agent and to record the given smart contract as being associated with the given autonomous agent.

11. The decentralized computing system of claim 1, wherein the distributed computing arrangement further comprises an autonomous agent map configured to associate a given autonomous agent with a corresponding functionality and record the given autonomous agent as being associated with the corresponding functionality.

12. The decentralized computing system of claim 1, wherein when the transfer of the locked funds is executed for the first trade from the verification module to the execution module, an ownership of the locked funds is transferred from the first user device to the second user device, and wherein when the transfer of the locked trade subject is executed for the second trade from the execution module to the verification module, an ownership of the locked trade subject is transferred from the second user device to the first user device.

13. The decentralized computing system of claim 1, wherein when a given autonomous agent fails to fulfil fulfill a given request, the at least one computing node is further configured to select another autonomous agent from the agent database and use the another autonomous agent as a given autonomous agent.

14. The decentralized computing system of claim 1, further configured to employ a decentralized order book model to store information about the first and the second trades across the plurality of computing nodes.

15. A method of operating a decentralized computing system, the method comprising:

receiving, from a first user device, a first request for placing a first trade on a trading platform;

receiving, from a second user device, a second request for placing a second trade on the trading platform;

sending a first set of trade parameters, corresponding to the first trade and a first digital signature of a first autonomous agent, from the first autonomous agent to a second autonomous agent via a communication interface, the first autonomous agent being associated with the first user device and the second autonomous agent being in an agent database;

performing a trade match between the first set of trade parameters and the second set of trade parameters corresponding to the second trade, by configuring the second autonomous agent, wherein the second autonomous agent is associated with the second user device;

configuring a verification module to:

lock funds for the first trade;

receive, from the second autonomous agent, the first digital signature, the first set of trade parameters, and the second set of trade parameters;

verify the first digital signature, the first set of trade parameters, and the second set of trade parameters; and transfer the locked funds to an execution module; and configuring an execution module, that is communicably coupled to the verification module, to:

lock a trade subject for the second trade; and transfer the locked funds to the second user device and the locked trade subject to the first user device, thereby completing the autonomous agent-based trading, wherein the method further comprises automatically creating the communication interface when the first and the second autonomous agents are required to interact with each other to fulfill requests for the first and the second trades.

16. The method of claim 15, further comprising:

generating a first notification in response to receiving the first request;

generating a second notification in response to receiving the second request;

sending the first and second notifications to the agent database, determining whether a set of autonomous agents configured to serve the first and second requests exists in the agent database;

when the set of autonomous agents configured to serve the first and second requests exists in the agent database, employing existing autonomous agents of the set as the first autonomous agent for executing the first request and as the second autonomous agent for executing the second request; and when the set of autonomous agents configured to serve the first and second requests does not exist in the agent database, creating new autonomous agents and employing the new autonomous agents as the first autonomous agent for executing the first request and as the second autonomous agent for executing the second request.

17. The method of claim 15, wherein the verification module comprises a first smart contract for verifying the first digital signature, the first set of trade parameters, and the second set of trade parameters, wherein the execution module comprises a second smart contract for transferring the locked funds to the second user and the locked trade subject to the first user, thereby completing the autonomous agent-based trading.

18. The method of claim 15, further comprising employing a decentralized order book model to store information about the first and the second trades across the plurality of computing nodes.

* * * * *